United States Patent [19]
Shafir et al.

[11] Patent Number: 5,742,603
[45] Date of Patent: Apr. 21, 1998

[54] METHOD AND APPARATUS FOR INTEGRATING REPEATER MANAGEMENT, MEDIA ACCESS CONTROL, AND BRIDGING FUNCTIONS

[75] Inventors: Haim Shafir, Sacramento; Mark T. Feuerstraeter, Rancho Cordova, both of Calif.

[73] Assignee: Level One Communications, Inc., Sacramento, Calif.

[21] Appl. No.: 528,205

[22] Filed: Sep. 14, 1995

[51] Int. Cl.$^6$ .................................................. H04L 12/28
[52] U.S. Cl. .................... 370/401; 340/825.07; 370/501
[58] Field of Search .................................. 370/246, 401, 370/402, 400, 501; 340/825.06, 825.07, 825.05, 825.51, 825.52; 380/3, 4, 48, 49, 50

[56] References Cited

U.S. PATENT DOCUMENTS

| | | |
|---|---|---|
| 4,063,220 | 12/1977 | Metcalfe et al. . |
| 4,099,024 | 7/1978 | Boggs et al. . |
| 5,136,582 | 8/1992 | Firoozmand . |
| 5,161,192 | 11/1992 | Carter et al. . |
| 5,177,788 | 1/1993 | Schanning et al. . |
| 5,249,183 | 9/1993 | Wong et al. . |
| 5,265,123 | 11/1993 | Vijeh et al. . |
| 5,345,447 | 9/1994 | Noel . |
| 5,353,353 | 10/1994 | Vijeh et al. ........................ 370/401 |
| 5,414,694 | 5/1995 | Crayford et al. .................. 370/401 |
| 5,430,762 | 7/1995 | Vijeh et al. . |

FOREIGN PATENT DOCUMENTS

| | | |
|---|---|---|
| 0 495 575 | 7/1992 | European Pat. Off. . |
| WO 92/17960 | 10/1992 | WIPO . |

OTHER PUBLICATIONS

Saunders, Stephen, "No–Frills Hubs: Stack 'Em and Save", Data Communications, New York, US, 21 Nov. 1993, vol. 22, No. 17, pp. 83, 84, 8692.

Saunders, Stephen, "A Port–Switching Hub for Two LAN Worlds", Data Communications, New York, US, Jan. 1994, vol. 23, No. 1, pp. 90–91.

De Souza, Edwin, "Emerging Architectures for 10BaseT Environments", Wescon Conference Record, North Hollywood, CA, US, Nov. 1991, vol. 35, pp. 222–228.

"Am79C981 Integrated Multiport Repeater Plus" (IMR+™) Advanced Micro Devices, Inc., publication #17306, Rev. A, Amendment/0, Feb. 1993, 41 pp.

"LXT901 Universal Ethernet Interface Transceiver" Advance Information Standard, Feb., 1991, Level One Communications, Inc.

"LXT902 Ethernet Twisted–Pair Media Attachment Unit" Preliminary Information Standard Product, Jul., 1990, Level One Communications, Inc.

"T7202 Smart Hub Controller (SHC)," Preliminary Data Sheet, Sep. 1992, AT&T Microelectronics.

(List continued on next page.)

*Primary Examiner*—Hassan Kizou
*Assistant Examiner*—A. Bnmmoussa
*Attorney, Agent, or Firm*—Merchant, Gould, Smith, Edell, Welter & Schmidt, P.A.

[57] ABSTRACT

A system consisting of a repeater management function and media access control into a single device. The repeater management functions and the media access control may also be combined with bridging support functions. The repeater management function uses a repeater management interface to control information transferred to an access port and to control repeater functions under direction of access port and monitor repeater function and provide status via access port and to control the bridge support function. The bridge function controls information transferred through a bridge port. The MAC function transfers information between the repeater data port and the MAC port (transmit/receive). The integration of the media access controller and repeater management into a single device is independent of the implementation of any of the ports.

10 Claims, 5 Drawing Sheets

OTHER PUBLICATIONS

DP83955/DP83956 LitE End Repeater Interface Controller (LERIC™) Preliminary, May, 1992, National Semiconductor Corporation.

"DP83950A Repeater Interface Controller (RIC)" Preliminary, Sep., 1991, National Semiconductor Corporation.

"International Standard", ISO/IEC 8802-3:1990, ANSI/IEEE Std. 802.3-1990 Edition.

"T7201 Multi-Port Repeater Unit (MPR2)" Preliminary Data Sheet, Jun., 1990, AT&T.

"Project 802 Local & Metropolitan Area Networks" Draft Supplement to IEEE Std. 802.3, Type 10BASE-T, P802.3I/D11, Jun. 28, 1990.

"ML4653 10BASE-T Transceiver For Multi-Port Repeaters" Advance Information, Sep., 1989, Micro Linear Corporation.

Tugal, Dogan A., and Tugal, Osman, "Chapter 12 Local-Area Networks", *Data Transmission*, 2d ed., McGraw-Hill Book Company, 1989, pp. 389-408.

Shotwell, Robyn E., "The Ethernet Sourcebook", Elsevier Science Publishing Company, New York NY, 1985, pp. 281-286.

METHOD AND APPARATUS FOR INTEGRATING REPEATER MANAGEMENT, MEDIA ACCESS CONTROL, AND BRIDGING FUNCTIONS

BACKGROUND OF THE INVENTION

1. Field of the Invention

This invention relates in general to an repeater management device, and in particular, to a method and apparatus for integrating repeater management, media access control, and bridging support functions into a single device.

2. Description of Related Art

Recent advancements in the art of data communications have provided great strides in resource sharing amongst computer systems through the use of networks which offer reliable high-speed data channels. Networks allow versatility by defining a common standard for communication so that information independent of vendor equipment may be exchanged across user applications. As the popularity of networks increase so does the demand for performance. More sophisticated protocols are being established to meet this demand and are utilizing existing twisted pair cables in office buildings so that virtually all computer literate users have access to resources with minimal expense.

The standard for Local and Metropolitan Area Network technologies is governed by IEEE Std. 802. IEEE Std. 802 describes the relationship among the family of 802 standards and their relationship to the ISO Open System Interconnection Basic Reference Model and is herein incorporated by reference. Generally, IEEE Std. 802 prescribes the functional, electrical and mechanical protocols, and the physical and data link layers for Local and Metropolitan Area Networks (LAN/MAN). The specification augments network principles, conforming to the International Standards Organization (ISO) seven-layer model for open systems interconnection (OSI), commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

The definitions of an Ethernet Repeater and an Ethernet MAC (Media Access Control) function are contained in the IEEE 802.3 specification, which is herein incorporated by reference. This standard defines attributes which can be used by a management function within an IEEE 802.3 Ethernet Repeater to monitor network behavior.

An Ethernet bridge is a device with two or more physical ports that is capable of forwarding a packet received on any port to any other single port based on the destination address of the packet. A packet that is not forwarded to a port is considered filtered.

A Media Access Control (MAC) function converts digital information, typically stored in memory in the form of a packet, into an actual Ethernet frame which can be transmitted on an Ethernet connection, or a frame received from the network connection which is stored in memory as a packet.

There have been many schemes for providing the bridging functionality between two such users. The most common involves direct passing wherein two Media Access Controllers are tied directly together. The functionality of the direct bridging must be controlled by processes within the Media Access Controllers (MACs) or by an independent CPU. Providing the code to control the bridging increases cost and requires the use of pins other than the data path to communicate status and commands between two MACs.

In order to propagate data signals along lengthy networks, repeaters are used to amplify and to recondition the signals along the network. Ethernet repeater management implementations typically maintain a list of attributes relating to ethernet repeater functions as defined in any commonly accepted industry standard and provides accessibility to these attributes. In addition, the management function also provides additional status of and control over repeater functions to an external function.

A secondary out-of-band port that is not part of the repeater domain is desirable for management of traffic because it does not utilize any bandwidth from the repeater domain. To provide greater network efficiency, it is also desirable for the functions of network repeater management, ethernet MAC, and network bridging to be combined into a single device.

Therefore, there is a need for greater network efficiency by combining the functions of network repeater management, ethernet MAC, and network bridging support functions into a single device.

SUMMARY OF THE INVENTION

To overcome the limitations in the prior art described above, and to overcome other limitations that will become apparent upon reading and understanding the present specification, the present invention discloses a system which combines the functions of repeater management, ethernet MAC, and network bridging support into a single device.

The present invention solves the above-described problems by providing a system consisting of a repeater management function, MAC function, and bridging support functions combined into a single device. The repeater management function uses a repeater management interface to control repeater functions as directed by commands received on the access port and to monitor repeater functions and supply the status of those functions in response to queries directed over the access port. Some of the information collected by the repeater management function is sent to the bridge support function where it directs operation of that function. The bridge support functions support bridging of data between the MAC function and the bridge port. The MAC function allows transmitting of data packets from the MAC port or bridging support functions to the repeater data port and allows receiving of packets from the receiver data port to the MAC port. The integration of the functions is independent of the implementation of any of the ports.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
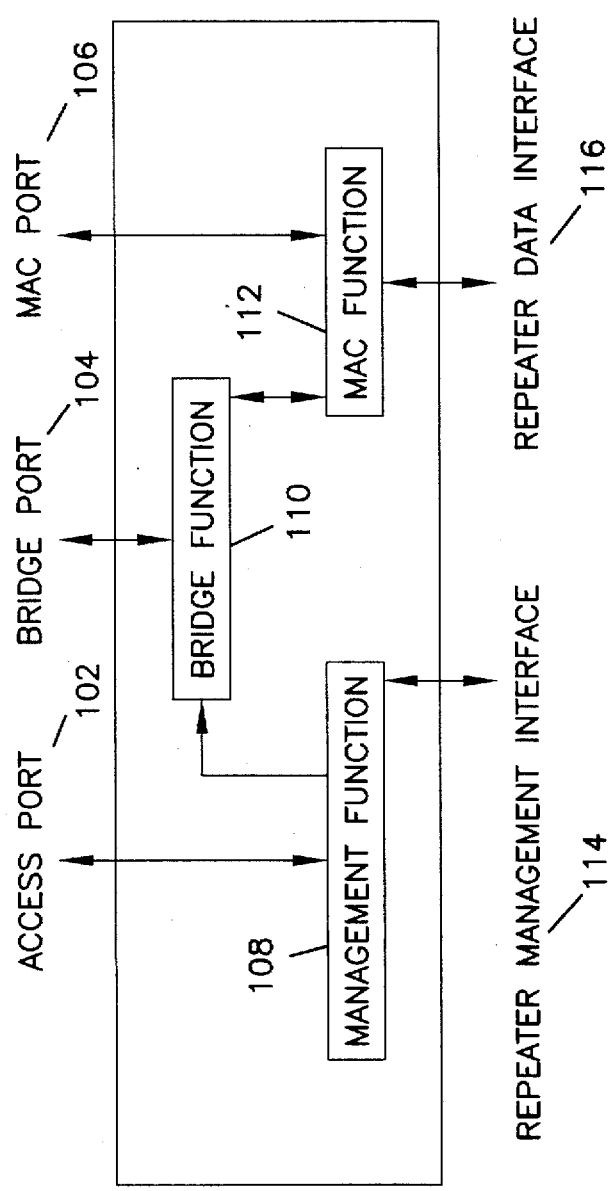
FIG. 1 is a functional block diagram illustrating the relationship between the management functions, the bridging support functions and the MAC functions in accordance with the present invention.

The present invention provides a system consisting of a MAC function 112 and repeater management function 108 combined into a single device. The MAC function 112 and the repeater management function 108 may be further combined with bridging support functions 110. The preferred embodiment of the present invention includes system components as shown in FIG. 1. A repeater management function 108 uses a repeater management interface 114 to control and monitor repeater functions. The repeater management function 108 maintains attributes relating to Ethernet repeater functions as defined in any commonly accepted industry standard and provides accessibility to these attributes. The management function provides access to these functions through an access port 102. The current status of all monitored repeater function are maintained in internal registers at all times. These registers may be accessed at will through the access port 102.

A MAC function 112 receives data packets from the inter repeater backplane 116 (also known as a repeater data interface). The MAC function 112 includes a MAC port 106. Once the packet is received from the inter repeater backplane 116 it is stored in memory via the MAC port 106. Further, the MAC Functions 112 has a transmit function which converts digital information, typically in the form of a packet, into an actual Ethernet frame which is then transmitted onto the inter repeater backplane 116. The MAC provides preamble and cyclic redundancy check (CRC) generation and detection, deferral and collision handling, back-off algorithm and automatic retry. The MAC normally detects and rejects runts, oversized packets, and packets with CRC or alignment errors, but also offers alternate modes which allow capturing of errored packets.

The MAC function 112 and the repeater management function 108 may be further combined with bridging support functions 110. Each MAC in a bridging network will have a unique address to facilitate the bridging function 110. The bridge function 110 has two ports. A bridge port 104 is provided which is external to the device. A port from the MAC function 112 is also provided. The bridging function 110 is partially controlled by the repeater management function 108.

The preferred embodiment provides initialization, control and status of up to three repeaters, including the following functions:

1. Link Status and Link Status Change.
2. Partition Status and Partition Status Change.
3. Polarity Status.
4. AUI Status (AUI ports only).
5. Auto Partitioning Enable/Disable.
6. Link integrity Checking Enable/Disable.
7. Polarity Detection/Correction Enable/Disable.
8. Enable/Disable for the Transmitter and Receiver (independent).
9. Reduced Squelch (extended range) Enable/Disable.

The present invention supports the Ethernet MIB through a status word that is written out to memory as part of a packet header whenever a packet is transmitted or received. This same information is also available in transmit and receive status registers. The MAC host channel has an RMON probe mode, which receives all, including self-generated, traffic. This enables a software application to support the other seven RMON groups.

Figure 2:
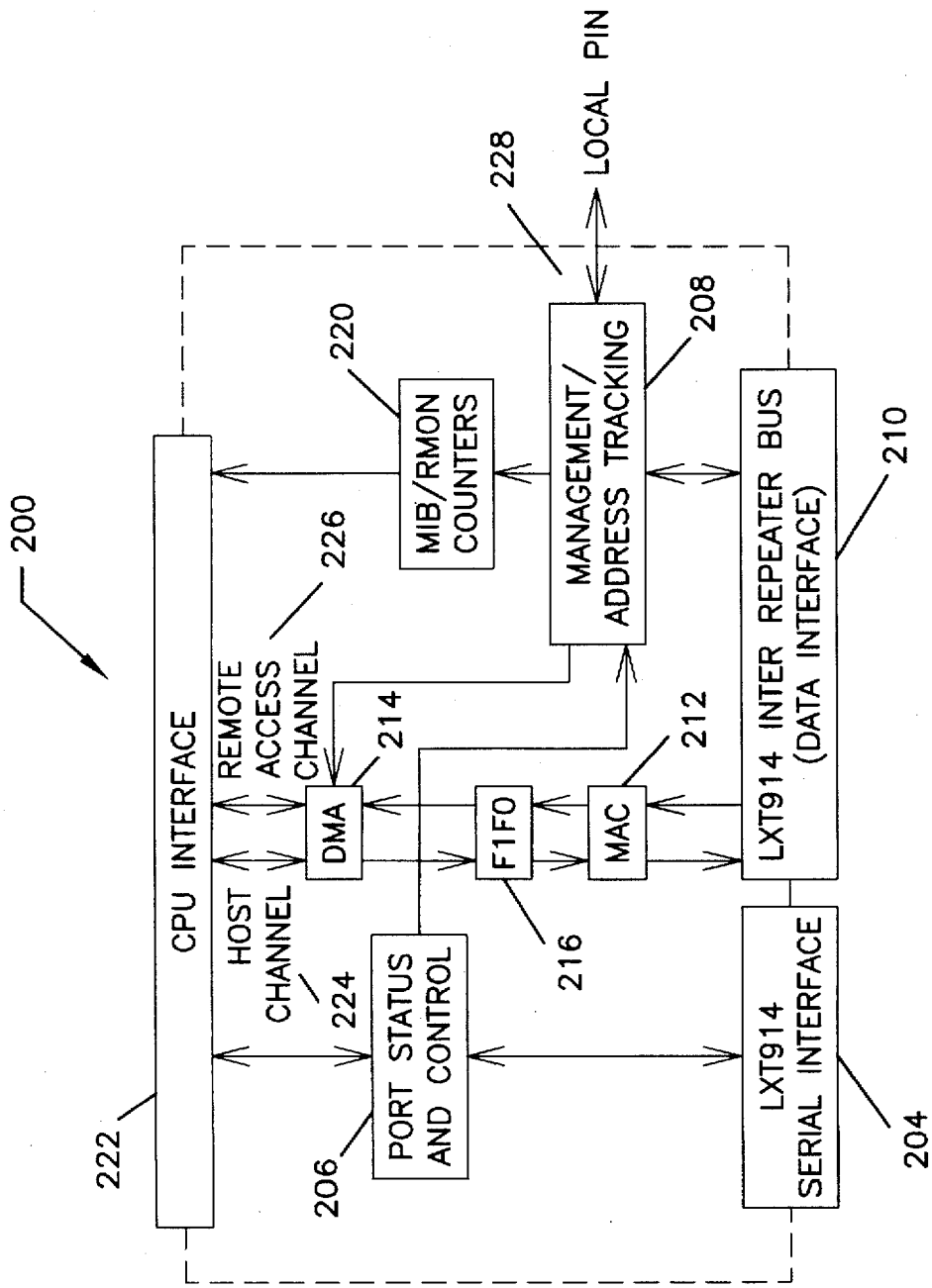
FIG. 2 is a system block diagram showing a repeater management device (RMD) in accordance with the present invention.

A repeater management device (RMD) 200 in accordance with the present invention is illustrated in FIG. 2. The RMD 200 uses a serial interface 204 connecting with the repeaters to route information pertaining to port status and control 206. This information may then be relayed to the management and address tracking function 208. A repeater data interface 210 is used by the management and address tracking function 208 as well as with the MAC 212, DMA controller 214, and FIFOs 216 for snooping the inter repeater bus. MIB and RMON counters 220 are provided per port for tracking repeater port status. The port status and control 204, DMA controller 214 and the MIB and RMON counters have access to the CPU interface 222. A mac port 224 and a bridge port 226 are provided between the CPU interface 222 and the DMA controller 214. The transfer of information to the management and address tracking function 220 is controlled using security monitoring defined in the management and address tracking function 220. Finally, a local port 228 provides a communication channel to other RMDs 200.

Figure 3:
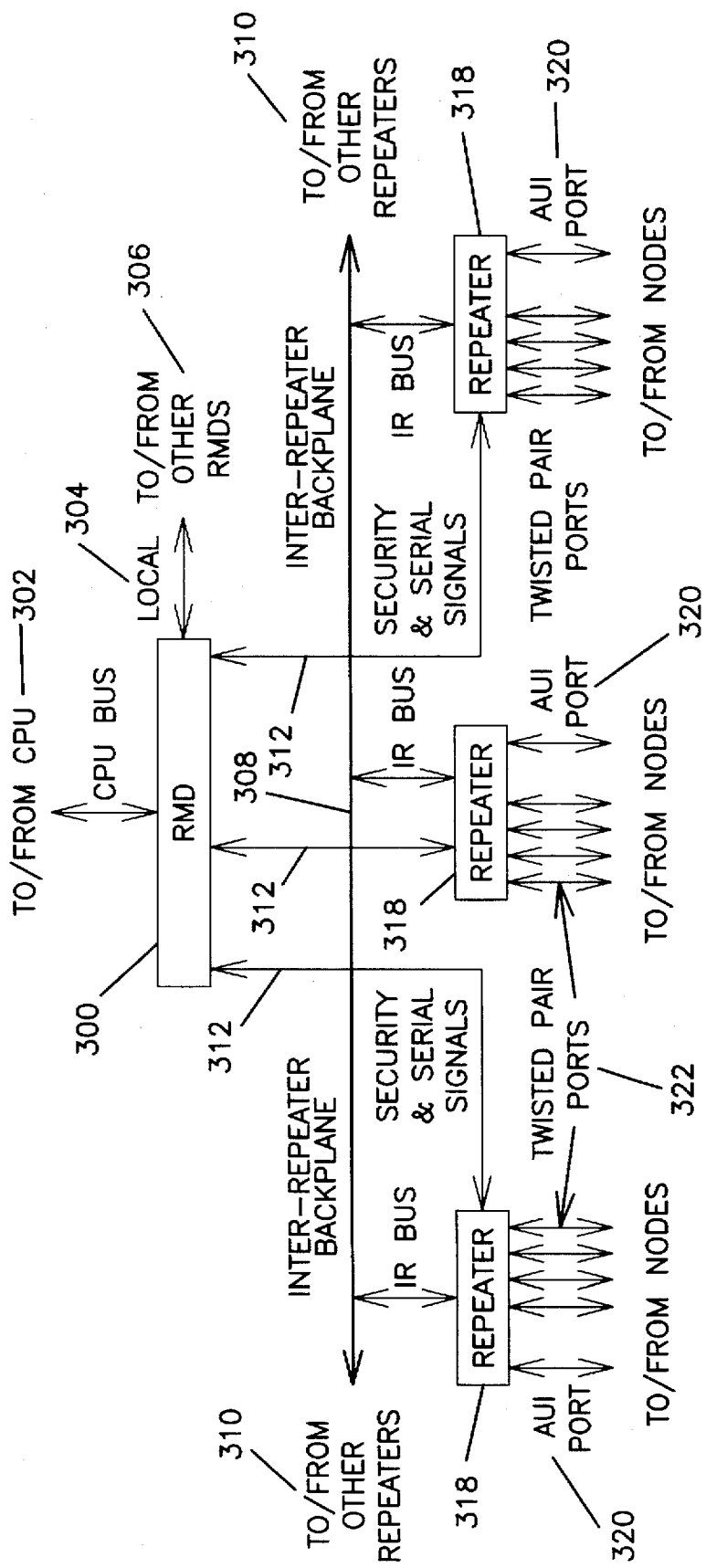
FIG. 3 is a block diagram of a RMD in accordance with the present invention.

The preferred embodiment of the present invention provides a complete Ethernet MAC with all the standard functions plus several enhanced features, as shown in FIG. 3. FIG. 3 illustrates the implementation of the RMD 300. A CPU bus connects the RMD to a CPU 302. A local port 304 is used to transfer information to and from other RMDs 306. An inter-repeater bus 308 routes information to and from remote repeaters 310. Security and Serial signals 312 are routed to repeaters 318 connected to the RMD 300. The repeaters provide AUI ports 320 and twisted pair ports 322. Security The preferred embodiment of the present invention provides several security features including Source Address Tracking, Source Address Matching and a Secure Operations Mode.

The Source Address Tracking function constantly tracks the source addresses on each of 15 ports and latches them to registers which ccan be read at any time. When the source address of any port changes, the system latches the identity of that port and asserts its interrupt line. This provides for intruder detection.

The Source Address Matching function constantly compares the source addresses of incoming packets to an address programmed into a register. If a match occurs, the system latches the identity of the port which received the packet and asserts its interrupt line.

The Secure Operations Mode can be enabled on a port-by-port basis. The destination address of an incoming packet is compared to the tracked source addresses of all enabled ports; any port which does not match receives a "jam" pattern instead of the original packet. Ports that do not have this function enabled continue to operate normally.

Memory Structure

Figure 4:
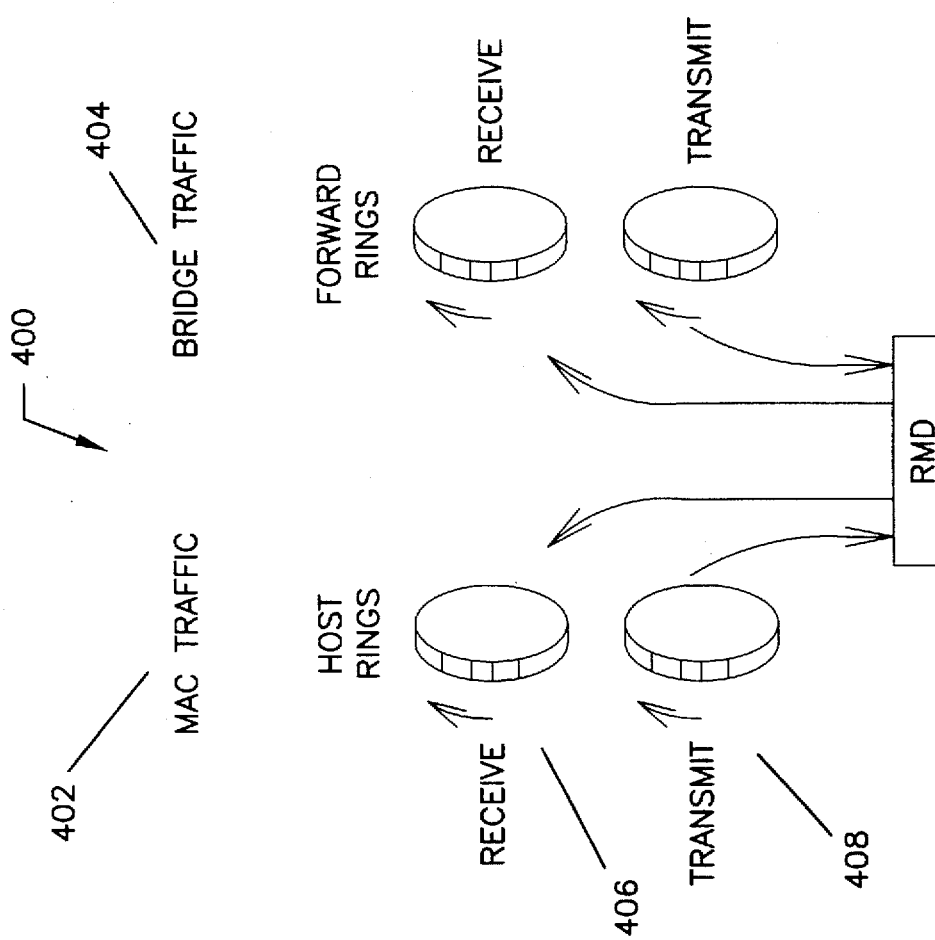
FIG. 4 is a system diagram showing routing of MAC and bridge packets which is compatible with the present invention.

The system DMA's packets directly to and from memory with low CPU overhead. FIG. 4 illustrates a dual-ring structure 400 for the MAC traffic 402 and the Bridge traffic 404. Packet memory is implemented in the dual-ring host structure 400 with one ring used for receive traffic 406 and the other ring used for transmit traffic 408.

Packets to be transmitted are first loaded in the Host Transmit Ring 408. Each packet is then preceded by a 4-byte header. The header includes a control byte, a pointer to the next packet, a status byte and the packet length. Multiple packets can be chained together using two bits in the control byte. The CRC can either be loaded as part of each packet, or generated by the system, controlled on a packet-by-packet basis through another bit in the control byte.

When a bit in the Control Register of the system is set, the transmitter begins operation by loading the start of the first packet into an internal 32-byte FIFO. Network access is attempted as soon as possible. The system generates and transmits a 62-bit preamble, followed by a start of frame delimiter, and then begins to transmit the packet data. If a collision occurs, the system stops transmission of the packet, emits a jam pattern for a period of time specified in the 802.3 standard, and then re-attempts transmission after a back-off time. If multiple collisions occur, the back-off time is increased following a standard truncated exponential algorithm. After 16 collisions, transmission is aborted.

Once transmission of a packet is completed, the system updates the status byte in the packet header and the Transmit Status Register, optionally provides an interrupt, and automatically starts transmission of the next packet in the ring, if there is one. When there are no more packets in the ring, the system stops transmitting. The Transmit Status Register and status byte in the packet header contain all the information needed to support the Ethernet MIB in software.

When the system receives a packet, it places it in the Host Receive Ring, along with a 4-byte header and CRC. The header has the same format as that for a transmit packet. The status byte, which is also available through the Receive Status Register, has all the information needed to support the Ethernet MIB.

Through the Receive Configuration Register, the processor can control exactly what kinds of packets can be received into the Host Receive Ring. For example, received packets may include Broadcast Packets, Multicast Packets (even if this is disabled, the system will still receive packets that match one of the 9 spare MAC addresses), All Unicast Packets (if this is disabled, the system will receive only Unicast packets that match its MAC Address), Errored packets in any combination (long, runt, CRC error, collision fragments—but note that long packets are preferably truncated to 1518 or 2040 bytes depending on the setting of the JabberEnable bit in this register), and RMON Probe mode.

Operation of Ring Structure

Figure 5:
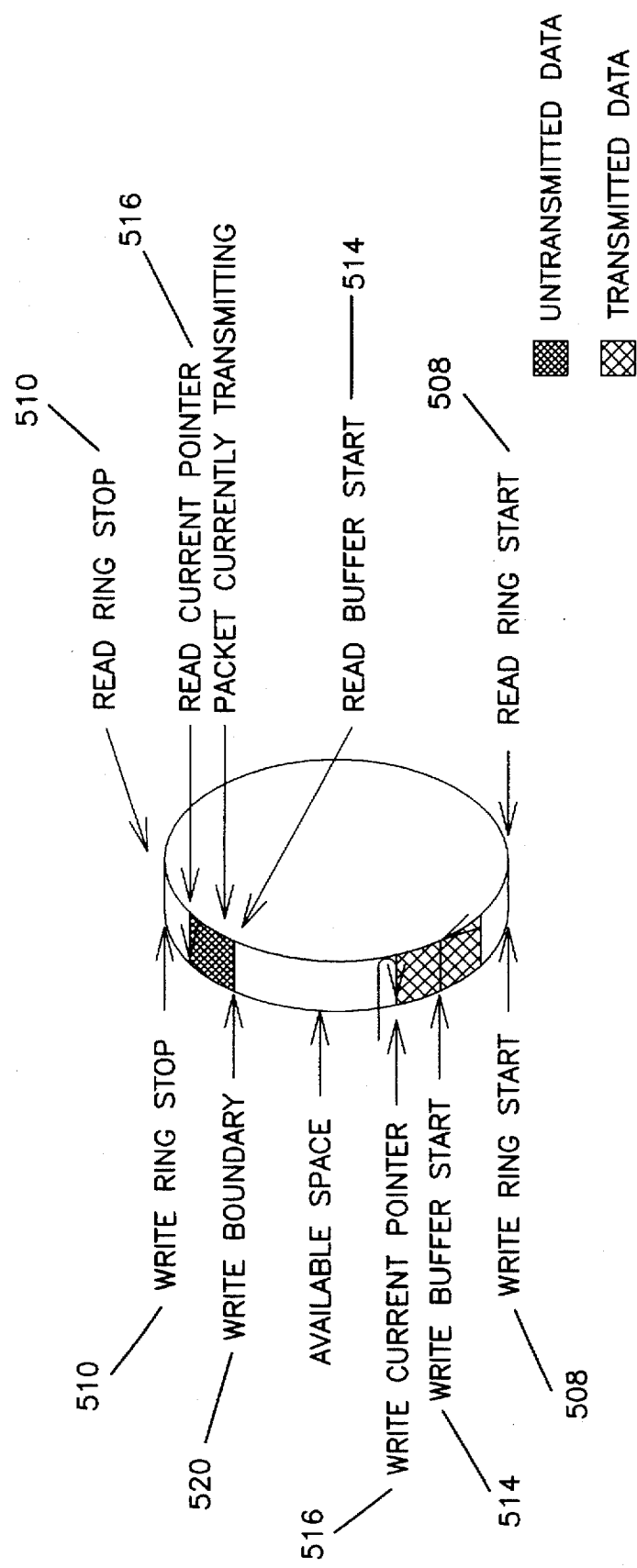
FIG. 5 is a block diagram illustrating a direct memory access (DMA) ring structure which is compatible with the present invention.

The Host Transmit Ring 500 is controlled through a set of 6 registers which are illustrated in more detail with reference to FIG. 5. The Start 508 and Stop 510 Registers, which must lie on 2K boundaries locate the ring 500 in memory. The Buffer Start 514, Current 516 and Next 518 pointers are used during packet processing, they should be initialized to point to the first packet to be transmitted. Note that all packets preferably start on 8-byte address boundaries.

The Host Receive Ring is defined in the same way, but has one additional register, the Write Boundary register 520. If the receiver reaches the Write Boundary 520 while receiving a packet, it terminates packet reception and sets a bit in the Interrupt Status Register. However, it does not stop operation, and continues to attempt to receive packets to the ring. If the Write Boundary 520 is placed outside the bounds defined by the ring start 508 and stop 510 registers, the receiver will continuously receive all packets to the ring 500, overwriting previously received packets even if they have not been read.

If the receiver reaches the Stop Boundary 510 while receiving the packet, it completes reception of the packet, then resets its pointers back to the Start 508 of the ring 500. At least 2K bytes of unused memory should be allocated beyond the boundary of the receive ring. An ownership bit in the status byte of the packet header is used to indicate the read/write status of a packet. The receiver always sets this bit to 1, the transmitter to 0. The transmitter and receiver work independently, each has a 32 byte FIFO internal to the system. Thus the system supports full duplex Ethernet operation. Once initialized, the system transmitter and receiver continue to function without further intervention. There are only two conditions which can cause a fatal error: a transmit FIFO underflow or a receive FIFO overflow. Either condition requires an external device to re-initialize the rings and re-start the operation. Either condition is evidence of a serious design problem (insufficient bus bandwidth).

Bridge Rings

For the bridge application, the system supplies a second pair of Forward Transmit and Receive rings, with their own sets of control registers, which function identically to the Host Rings. The system supplies an automatic filtering function for packets going into the Forward Receive Ring. Only non-errored, valid-length packets that meet one of the following conditions are written to the Forward Receive Ring. For example, Broadcast Packets or Multicast Packets and Unicast packets that do not match the MAC address or any local source address (provided that the local pin is not asserted) may be written to the Forward Receive Ring. A local pin is used by the slave management devices in an auxiliary way. The slave management devices assert this pin to indicate that the current packet is local (i.e. matches one of its local source addresses) and therefore should not be forwarded.

CPU Interface

The system directly provides two compatible modes of bus operation, with either 16-bit or 32-bit bus width. These modes are selected using external pins.

System Data Interface

The system data interface consists of the Inter Repeater Backplane (IRB), the 10 Mhz clock and the 20 Mhz clock. The IRB consists of 5 signals. Preferably, the IRB interface runs in a synchronous mode (i.e. 10 and 20 MHz supplied by external clock drivers and not by the repeaters.

The system management interface consists of the SDI, SDO, SENI and SENO signals. The system management interface is used by the system to configure up to three systems. The system management interface is also used by the system to provide status information about their ports and about packets they have recently received.

The system security interface consists of 15 signals, one for each supported port. When the signal that corresponds to a particular port is asserted, that port is put into secure operations mode.

Conclusion

Those skilled in the art will recognize that the present invention is applicable to any I/O device adapter that has a memory and is not limited to network adapters. The application cited in the present specification is for illustrative purposes only and is not intended to be exhaustive or to limit the invention to the precise form disclosed.

Those skilled in the art will also recognize that the present invention is applicable to systems with different configurations of devices and components.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A repeater management device for communication networks, the repeater management device controlling repeaters and routing data packets between a receiving port and a destination port, comprising:

repeater management means for controlling and monitoring repeater functions related to the retransmission of the data packets and for providing status of and control over repeater functions via an external repeater management interface;

bridging support means, coupled to the repeater management means, for receiving the data packets on the receiving port and for forwarding the received data packets to the destination port in accordance with a destination address; and media access controller, coupled to the repeater management means, for providing signal framing of the data packets and for controlling access to a repeater data interface.

2. The repeater management device of claim 1 wherein the repeater management means further comprises an access port for providing access to attributes relating to repeater functions.

3. The repeater management device of claim 1 wherein the bridging support means are controlled by the repeater management means.

4. The repeater management device of claim 1 wherein the management means further comprises a plurality of counters for traffic control.

5. The repeater management device of claim 1 wherein the media access controller further comprises means for generating preambles and error correcting codes, means for detecting error correcting codes, means for handling deferrals and collisions, means for controlling and handling backoff conditions, and means for retrying data transmission.

6. The repeater management device of claim 1 wherein the repeater management means further comprises registers for storing the attributes relating to repeater functions.

7. The repeater management device of claim 1 further comprising a media access control port for providing data packets received by the media access controller via the repeater data interface to memory.

8. The repeater management device of claim wherein the media access controller determines whether a data packet is to be sent to the bridge for forwarding to a destination address connected to the bridge port or whether a data packet is to be retransmitted via the repeater data interface.

9. The repeater management device of claim 1 wherein the repeater data interface comprises an inter-repeater backplane.

10. The repeater management device of claim 1 wherein the repeater management means further comprises a processor interface for providing direct memory access and semaphoring functions to support bridging functions of the bridging support means and media access control functions of the media access controller.

* * * * *

UNITED STATES PATENT AND TRADEMARK OFFICE
CERTIFICATE OF CORRECTION

PATENT NO. : 5,742,603　　　　　　　　　　　　　　　　　　　　　　　Page 1 of 1
DATED      : April 21, 1998
INVENTOR(S) : Shafir et al.

It is certified that error appears in the above-identified patent and that said Letters Patent is hereby corrected as shown below:

Column 8,
Line 21, "claim wherein" should read -- claim 1 wherein --

Signed and Sealed this

Twenty-eighth Day of May, 2002

Attest:

Attesting Officer

JAMES E. ROGAN
Director of the United States Patent and Trademark Office